United States Patent [19]
Tai

[11] Patent Number: 5,392,699
[45] Date of Patent: Feb. 28, 1995

[54] VEGETABLE AND FRUIT JUICE PROCESSOR AND SAFETY DEVICE THEREOF

[76] Inventor: Chun-Ya L. Tai, 9F-3, No. 92, Gin-Chang Rd., Taichung, Taiwan, Prov. of China

[21] Appl. No.: 194,144

[22] Filed: Feb. 9, 1994

[51] Int. Cl.⁶ .............................................. A23N 1/02
[52] U.S. Cl. ...................................... 99/492; 99/511; 99/513; 241/37.5; 241/92; 366/314; 366/601
[58] Field of Search ............................ 99/495, 510–513, 99/509, 484, 536; 210/360.1, 380.1, 369; 241/37.5, 92, 282.1, 282.2; 366/314, 601; 100/116

[56] References Cited

U.S. PATENT DOCUMENTS

| | | | |
|---|---|---|---|
| 1,906,054 | 4/1933 | Freese | 99/512 |
| 2,302,138 | 11/1942 | Nicholson | 99/512 |
| 3,106,948 | 10/1963 | Staeger | 99/512 |
| 3,123,114 | 3/1964 | Andrews et al. | 99/512 |
| 4,119,542 | 10/1978 | Yamaoka et al. | 210/380.1 |
| 4,350,087 | 9/1982 | Ramirez | 99/511 |
| 4,506,601 | 3/1985 | Ramirez et al. | 99/513 |
| 4,681,031 | 7/1987 | Austad | 99/511 |
| 4,700,621 | 10/1987 | Elger | 99/511 |
| 4,702,162 | 10/1987 | Sontheimer | 210/360.1 |
| 5,222,430 | 6/1993 | Wang | 241/92 |

FOREIGN PATENT DOCUMENTS 692847 3/1962 Canada .................................. 99/512

Primary Examiner—Timothy F. Simone
Attorney, Agent, or Firm—Browdy and Neimark

[57] ABSTRACT

This invention is directed to a vegetable and fruit juice processor having safety features. The processor has a housing mounted on the base, a motor mounted in the housing and provided with a transmission shaft extending through the top of the housing. In addition there is a switching set for controlling the operation of the motor, a driving body fastened to a top end of the transmission shaft, a rotary cutting body having a covering portion and a support portion, a toothed cutter mounted on the covering portion, a filtration screen surrounding the support portion, and a cap. The processor has a cover body with a receiving space having a first receiving slot and a second receiving slot, the first receiving slot being provided at the bottom thereof with a slope of a predetermined angle of inclination; and a channel disposed in an outer wall of the receiving space such that the channel is in communication with a front edge of the first receiving slot. The cover body is detachably mounted on a top fringe of the housing, and the rotary cutting body is disposed in the receiving space of the cover body. The support portion of the rotary cutting body is provided circumferentially at the top fringe thereof with a moving portion that is received in the second receiving slot.

4 Claims, 12 Drawing Sheets

VEGETABLE AND FRUIT JUICE PROCESSOR AND SAFETY DEVICE THEREOF

FIELD OF THE INVENTION

The present invention relates generally to a device for processing vegetable and fruit juices, and more particularly to a vegetable and fruit juice processor provided with safety features.

BACKGROUND OF THE INVENTION

The conventional vegetable and fruit juice processors are generally classified into juicers and extractors, which are not provided with the safety features.

SUMMARY OF THE INVENTION

It is therefore the primary objective of the present invention to provide a vegetable and fruit juice processor having safety features to protect the user thereof.

The objective, features and functions of the present invention will be more readily understood by studying the following detailed description of the present invention in conjunction with the drawings provided herewith.

DETAILED DESCRIPTION OF THE INVENTION

Figure 1:
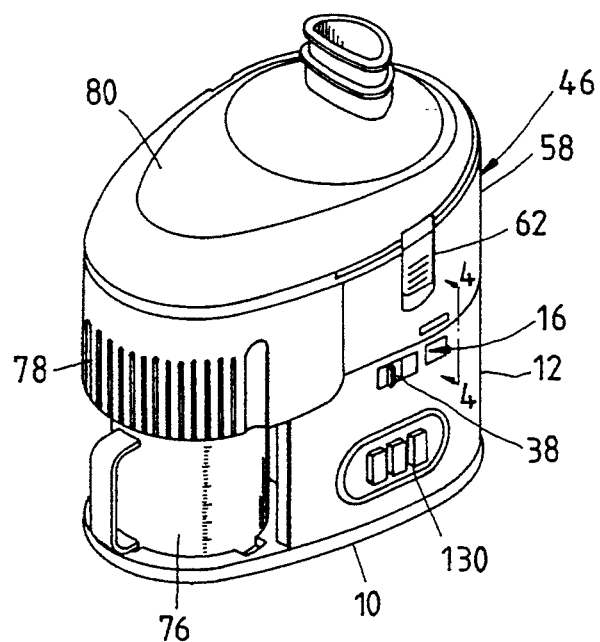
FIG. 1 shows a perspective view of the present invention in use.
Figure 2:
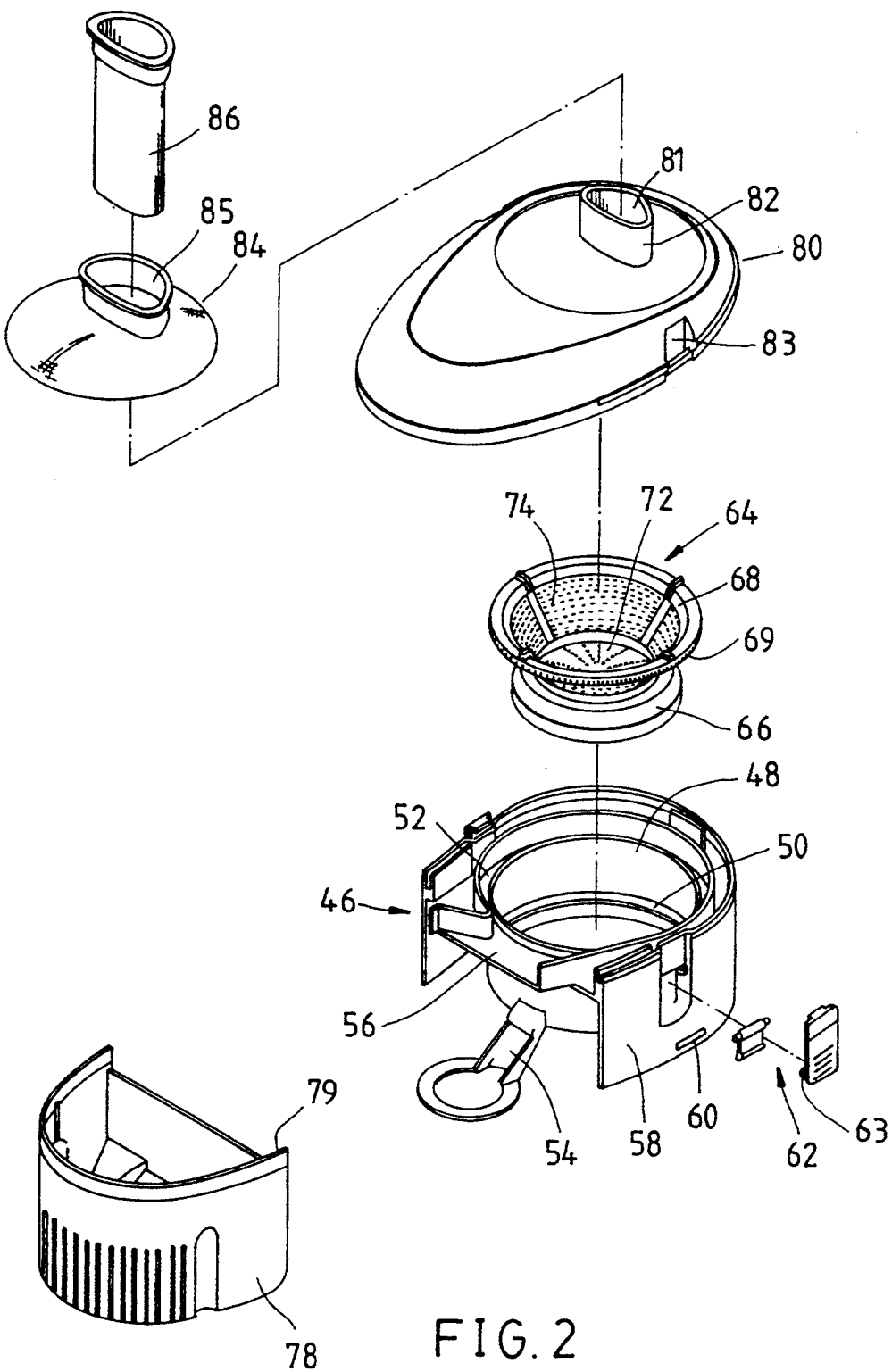
FIG. 2 shows an exploded view of the upper half portion of the present invention as shown in FIG. 1.
Figure 3:
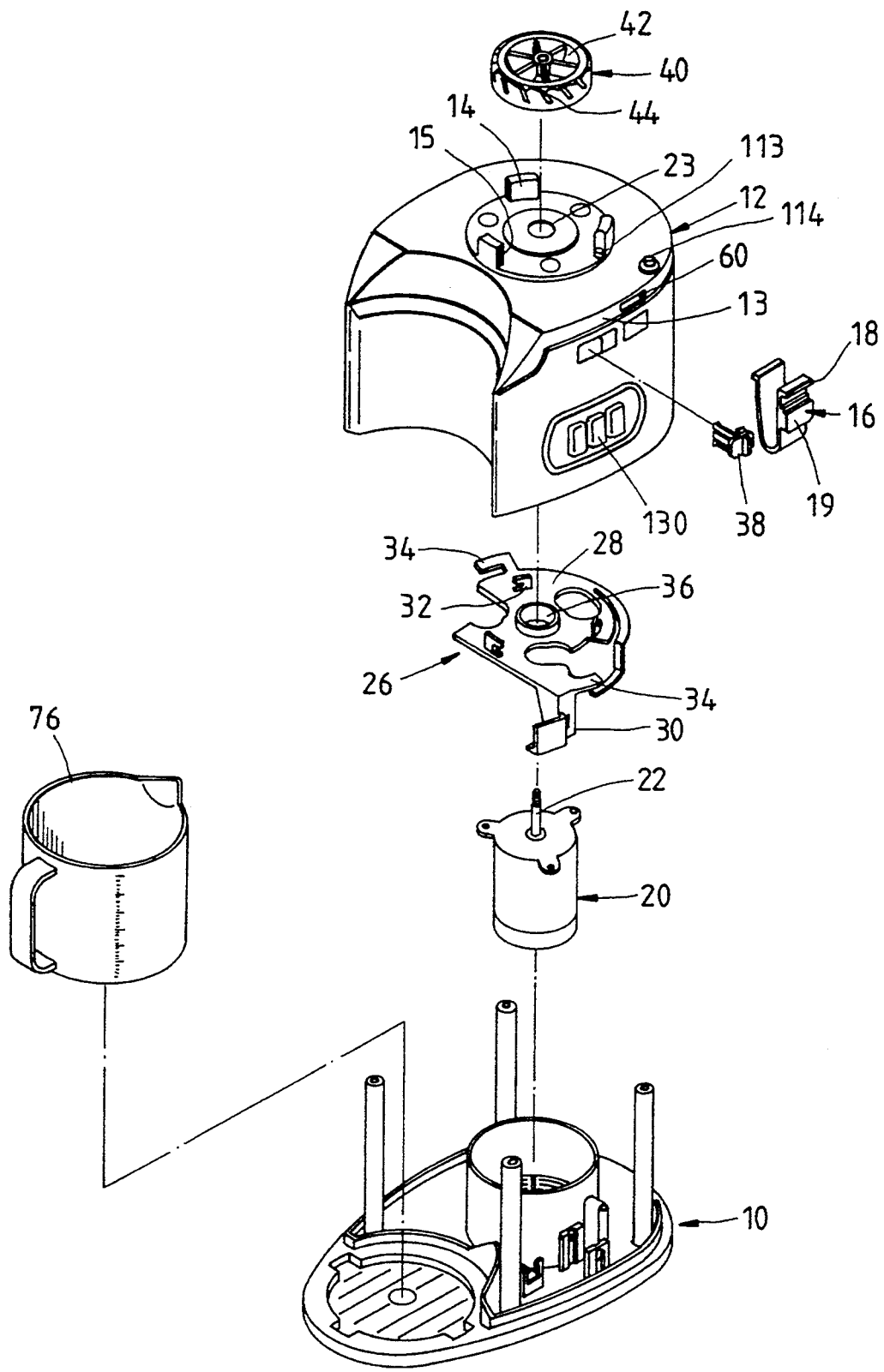
FIG. 3 shows an exploded view of the lower half portion of the present invention as shown in FIG. 1.
Figure 5:
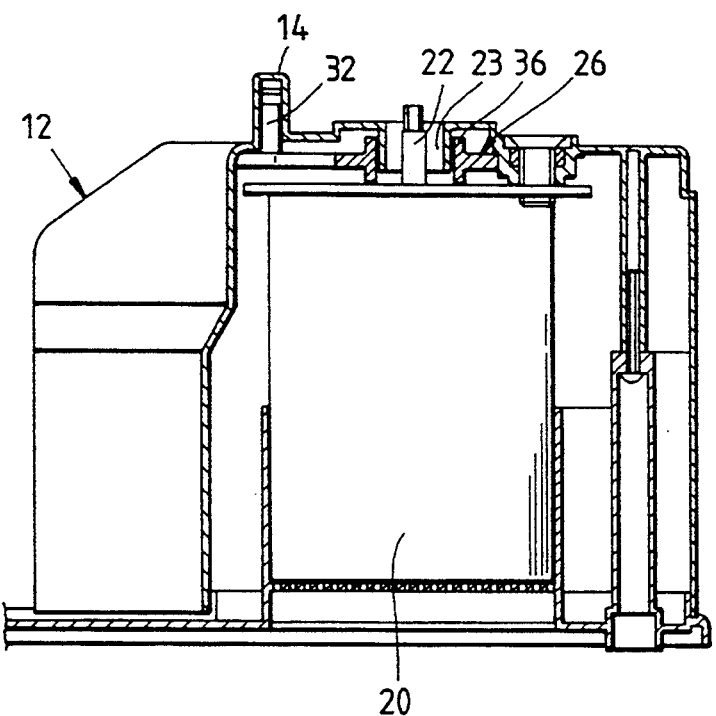
FIG. 5 is a sectional view showing that a fastening member is disposed in the housing.

As shown in FIGS. 1, 2 and 3, a vegetable and fruit juice processor embodied in the present invention is composed of the component parts described hereinafter.

A base 10.

Figure 4:
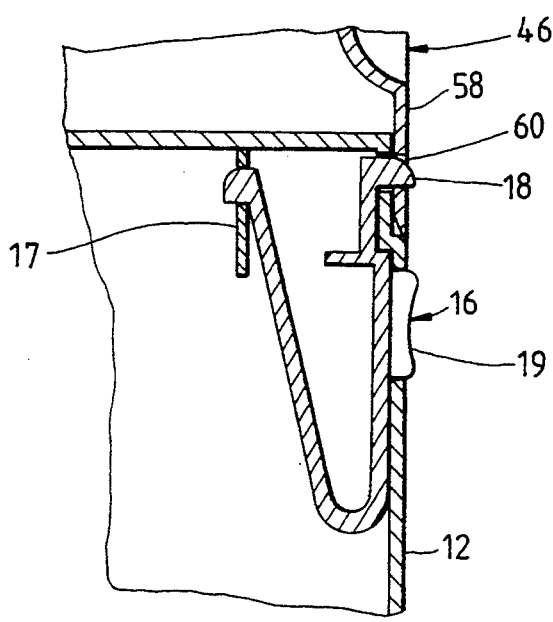
FIG. 4 is a sectional view of a portion taken along the line 4—4 as shown in FIG. 1, showing that a retaining member is inserted.

A housing 12 is provided at the top thereof with three locating columns 14 of hollow construction and spaced equidistantly. The three locating columns 14 are provided respectively in the same side with a cut 15. As shown in FIG. 4, each of two retaining members 16 is an elastic body having a V-shaped cross section and one body portion that is fastened to a rib 17 of the housing 12. Each of the two retaining members 16 has another body portion forming a hooked portion 18 and a press portion 19, which remain outside the housing 12. The housing 12 is mounted securely on the base 10.

A motor 20 is mounted in the housing 12 and provided with a transmission shaft 22 extending through a through hole 23 located at the top of the housing 12.

A switch 130 is disposed in one side of the housing 12 for regulating the operation of the motor 20.

Figures 9, 11:
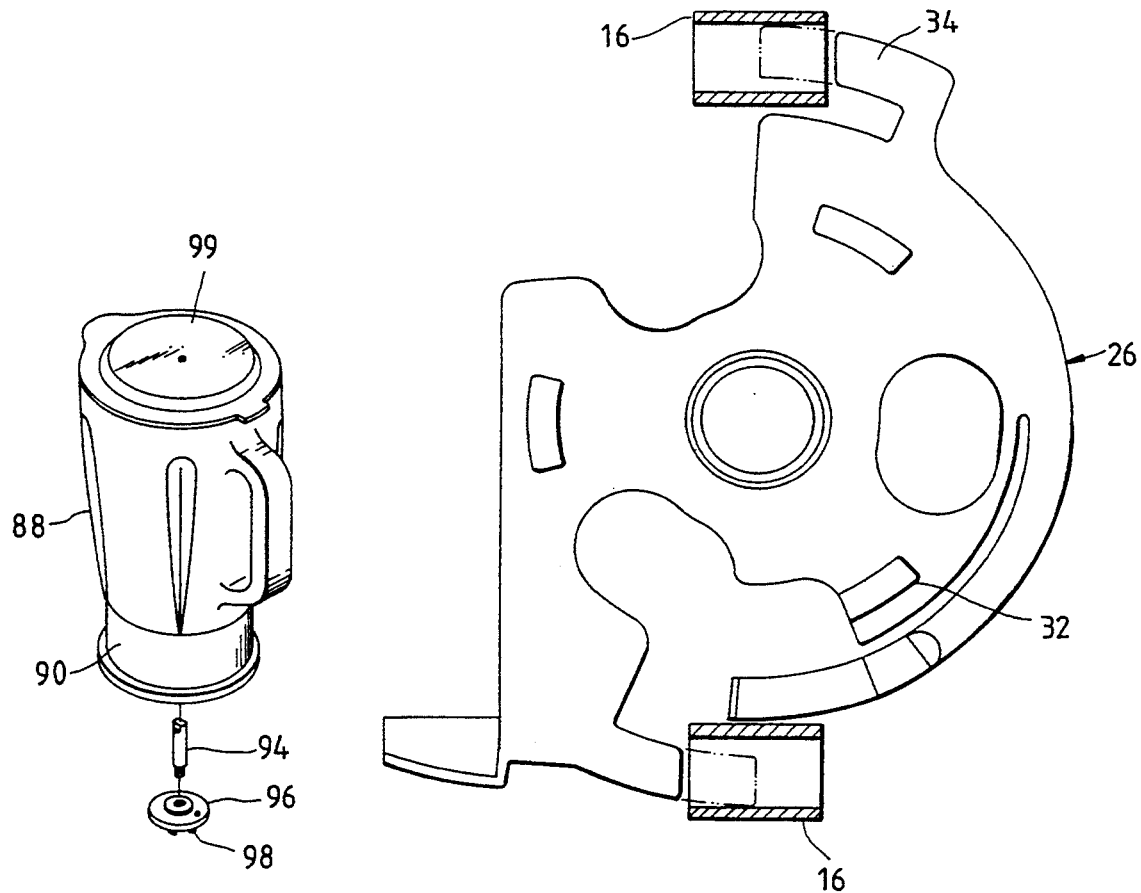
FIG. 9 is a schematic view showing the position of an arresting portion of the fastening member in relation to the retaining member.
FIG. 11 shows another exploded view of the present invention in use.

A fastening member 26 has a piece body 28 and a moving portion 30 which is connected with the piece body 28. Located on the top fringe of the piece body 28 are three equidistantly-spaced holding portions 32, which have an inverted L shape and two arresting portions 34. The fastening member 26 is disposed in the housing 12 such that a round hole 36 located centrally at the top of the fastening member 26 is stopped at the through hole 23 of the housing 12, and that the fastening member 26 can be rotated freely, with the round hole 36 serving as a center. The three holding portions 32 are disposed in the three locating columns 14. Each arresting portion 34 is corresponding in location to each retaining member 16, as shown in FIG. 9. A button 38 is connected with the moving portion 30 such that the button 38 can be used to cause the fastening member 26 to turn so as to cause the three holding portions 32 to extend outside the cuts 15 of the three locating columns 14.

A driving body 40 is provided in the top thereof with six insertion cells 42, which are spaced equidistantly. In addition, the driving body 40 is provided circumferentially with six insertion slots 44 spaced equidistantly and having a predetermined angle of inclination. The driving body 40 is fastened to the transmission shaft 22 of the motor 20 such that the driving body 40 is driven by the transmission shaft 22.

Figure 6:
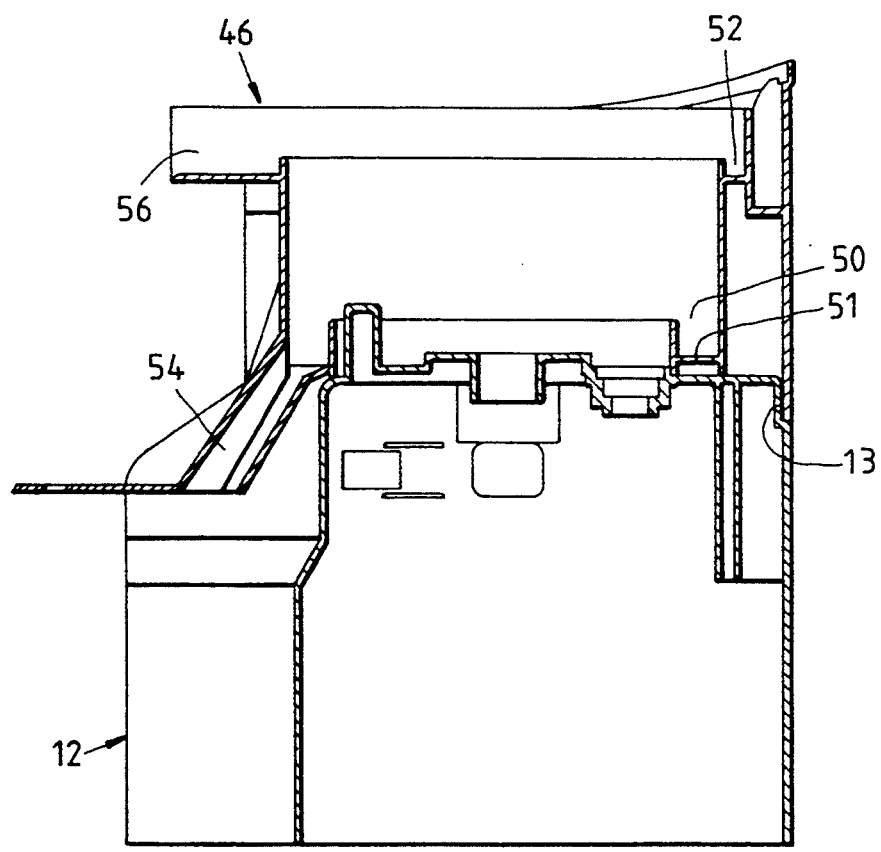
FIG. 6 is a sectional view showing that the housing and the cover are joined together.

A cover body 46 is provided therein with a receiving space 48 of a cylindrical construction and having at the bottom fringe thereof a first receiving slot 50 of a predetermined depth. The receiving space 48 is further provided in the top fringe thereof with a second receiving slot 52 of a predetermined depth. The first receiving slot 50 is provided at the bottom thereof with a slope 51 having a predetermined angle of inclination, as shown in FIG. 6. A channel 54 is disposed in the outer wall of the receiving cell 48 such that the channel 54 is in communication with the front edge of the first receiving slot 50. The second receiving space 52 is provided at the front edge thereof with an opening 56. A casing 58 is disposed on the outer edge of the cover body 46 and provided at the bottom fringe thereof with two holes 60.

Two rotary button set members 62 are disposed respectively in two sides of the circumference of the top fringe of the cover body 46.

Figure 7:
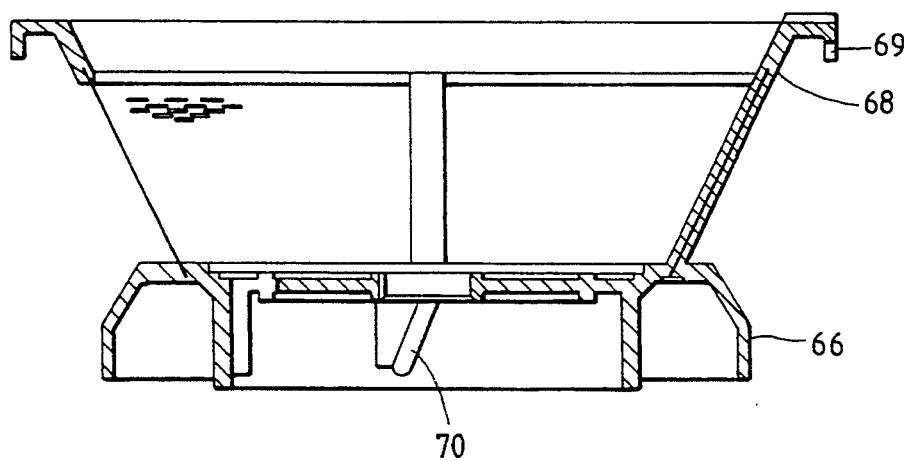
FIG. 7 shows a sectional view of a rotary cutting body.
Figure 8:
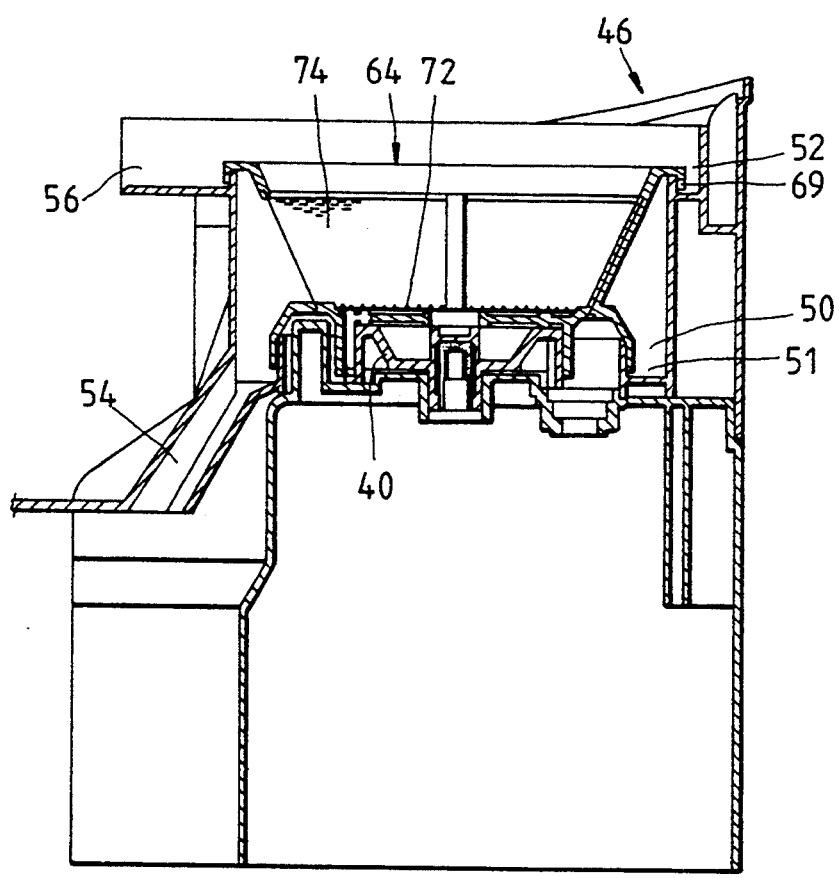
FIG. 8 is a sectional view showing that the rotary cutting body is received in the cover.

A rotary cutting body 64 comprises a covering portion 66 and a support portion 68 which is of a funnel-shaped construction and mounted on the covering portion 66. Now referring to FIG. 7, the covering portion 66 is shown to comprise in the inner fringe of the bottom thereof three insertion columns 70, which are spaced equidistantly and which extend downwards and obliquely. The support portion 68 is provided in the circumference of the top fringe thereof with a serrated moving portion 69. A toothed cutter 72 of a disklike construction is mounted on the top of the covering portion 66. A filtration screen 74 is disposed around the support portion 68. The rotary cutting body 64 is disposed in the receiving space 48 of the cover body 46 such that the rotary cutting body 64 is connected with the driving body 40. The outer edge of the covering portion 66 is disposed in the first receiving slot 50, as shown in FIG. 8. The serrated moving portion 69 of the support portion 68 is disposed in the second receiving portion 52.

A holding cup 76 is mounted on a seat located at the front end of the base 12.

A receiving cup 78 has two end edges 79 extending rearwards to engage the front edges of the stepped portion 13 of the housing 12. The bottom of the receiving cup 78 is supported by the lower end of the channel 54.

A cap 80 is provided in the top edge thereof with a through hole 81 of triangular construction. The through hole 81 is provided on the circumferential edge thereof with a protruded edge 82 having respectively on both sides thereof a hooked portion 83.

A guide tray 84 has a projection 85.

A press bar 86.

The present invention can be used as a fruit and vegetable juice extractor. The casing 58 of the cover body 46 is connected with the stepped portion 13 of the housing 12. Then the press portions 19 of the two retaining members 16 are pressed to cause the hooked portion 18 to move inwards, as shown in FIG. 4. Thereafter, the button 38 is turned to cause the fastening member 26 to displace, so as to cause the two arresting portions 34 to be located between the body portions of the two retaining members 16, as shown by the dotted lines in FIG. 9.

The rotary cutting body 64 is disposed in the receiving space 48 of the cover body 46 such that the three insertion columns 70 are received in the insertion slots 44 of the driving body 40. As a result, the circumferential edge of the covering portion 66 is lapped with the first receiving slot 50 while the serrated moving portion 69 is lapped with the second receiving slot 52.

Arrange the holding cup 76 and the receiving cup 78. The cap 80 is disposed on the cover body 46 and the receiving cup 78. The hooked portion 83 of the cap 80 is retained securely by the two rotary button set members 62.

The guide tray 84 is fitted with the cap 80 such that the projection 85 engages the protruded edge 82. The guide tray 84 may be fitted in reverse for collecting the dregs.

Figure 10:
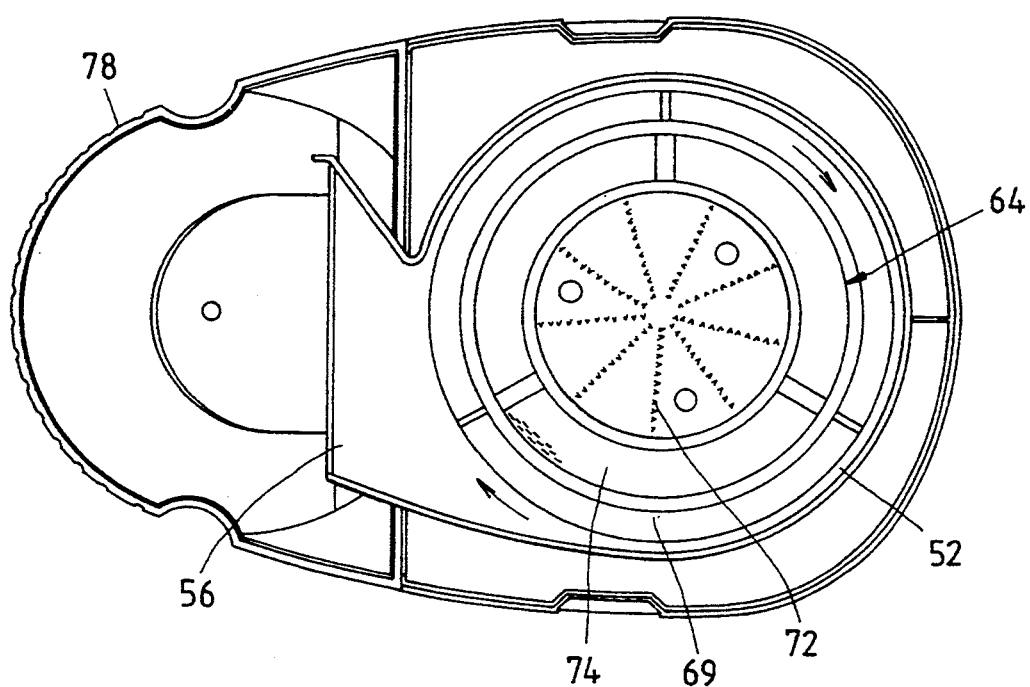
FIG. 10 is a schematic view showing that the rotary cutting body is caused to move vegetable and fruit residue in the receiving cup.

Upon completion of the set-up described above, the switch 130 is turned on to start the motor 20 to drive the driving body 40, which in turn actuates the rotary cutting body 64 to rotate. The bar-shaped pieces of fruit and vegetable are fed into the rotary cutting body 64 via the through hole 81 of the cap 80 and are subsequently cut by the toothed cutter 72. The fruit and vegetable juice is filtered out centrifugally by the filtration screen 74 and is then collected in the first receiving slot 50. The collected juice is then caused to flow along the slope 51 of the first receiving slot 50 toward the channel 54 through which the juice is held in the holding cup 76. The fruit and vegetable residue is caused by the centrifugal force to move upwards along the tapered filtration screen 74 to be collected in the second receiving slot 52 in which the collected residue is moved in a clockwise direction by the serrated moving portion 69 to be collected in the receiving cup 78 via the opening 56 of the second receiving slot 52, as shown in FIG. 10.

After use, the processor of the present invention is turned off before the component parts of the processor are dismantled. The button 38 is recovered to its original position so as to permit the fastening member 26 to make a reverse angular displacement to return to its original position, thereby bringing about the withdrawal of the two arresting portions 34 from the two retaining members 16, which can be then pressed to release the cover body 46.

Figure 12:
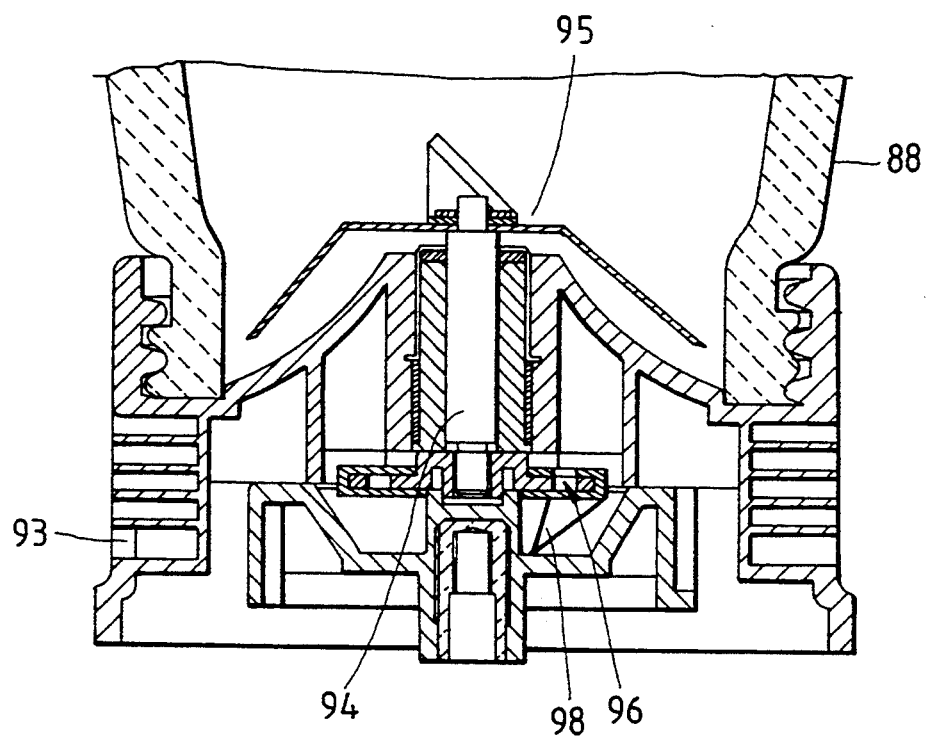
FIG. 12 is a sectional view showing the combination of a cup body and a cup seat as shown in FIG. 11.
Figure 13:
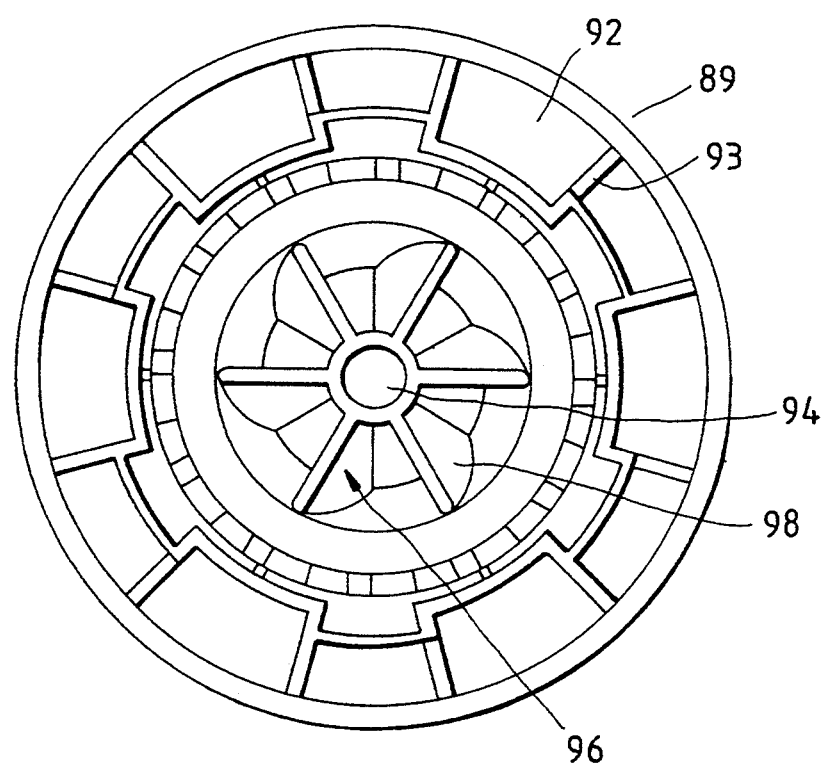
FIG. 13 shows a bottom view of the cup seat.

As illustrated in FIGS. 11 to 13, the processor of the present invention can be used as a juicer, which comprises the component parts described hereinafter.

A cup body 88.

A cup seat 90 is fastened securely to the bottom of the cup body 88 and provided at the bottom thereof with six recessed portions 92, which are spaced equidistantly. The recessed portions 92 are provided respectively in the same side with an insertin hole 93. A rotary shaft 94 is pivoted to the cup seat 90.

A cutting set 95 is mounted on the top end of the rotary shaft 94.

A driving member 96 is provided circumferentially at the bottom thereof with six insertion portions 98 of a tapered construction and spaced equidistantly. The driving member 96 is fastened to the bottom end of the rotary shaft 94.

A cup cover 99.

The cup body 88, the cup seat 90, the cutting set 95 and the driving member 96 are joined together as integral parts of a body.

Figure 14:
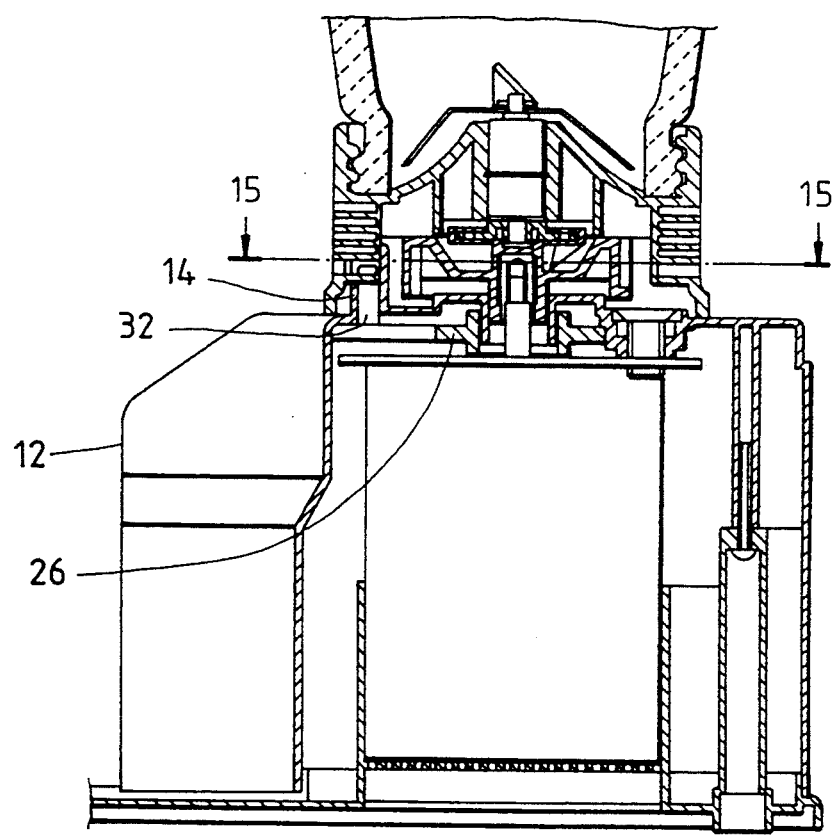
FIG. 14 is a schematic view showing that the cup seat is disposed in the housing.

In operation, three recessed portions 92 of the cup seat 90 are fitted over the three locating columns 14 of the housing 12 while the insertion portions 98 of the driving member 96 are fitted into the insertion cells 42 of the driving body 40, as shown in FIG. 14.

The button 38 is turned to actuate the fastening member 26 to rotate. Three holding portions 32 extend through the cuts 15 of the locating columns 14 to be received in the insertion holes 93 of the recessed portions 92 of the cup seat 90 so as to retain securely the cup seat 90, as indicated by the hypothetical lines in FIG. 15.

Fruit and vegetable are placed in the cup body 88, which is then covered with the cup cover 99. As the motor 20 is turned on, the driving body 40 is driven by the motor 20 to drive the driving member 96, which in turn actuates the cutting set 95 to cut the fruit and the vegetable into pieces to form fruit and vegetable juice. The fastening member 26 is moved to cause the holding portions 32 to return to their original positions, as shown by solid lines in FIG. 15. Therefore, the cup seat 90 is no longer retained. The cup body 88, the cup seat 90 and other component parts can be then removed.

Now referring to FIGS. 16 and 17, a safety device of the processor of the present invention is shown to comprise the component parts, which are described hereinafter.

A coupled mechanism is composed of a press rod 110 and a rocking arm 120. The press rod 110 is vertically mounted in the housing 12 such that the press rod 110 can be caused to slide upwards and downwards. The press rod 110 is further provided at the top thereof with a resisting portion 112 made up of two columnar portions 113 and 114 parallel to each other. The rocking arm 120 is provided with an urging portion 122 and a pivoting portion 124 located at the center of a body portion thereof. The rocking arm 120 is pivoted to the base 10 by means of the pivoting portion 124. The press rod 110 has a bottom end that is inserted into a through hole located at one end of the rocking arm 120.

A switching set 130 comprises a main body 132, an insulating plate 134, and three key set members 138. The insulating plate 134 is provided at the top thereof with a power conducting piece 135 and two conductive pieces 136. The insulating plate 134 and the main body 132 form together a receiving space. The three key set members 138 are provided respectively with a straddle column 140, which has an upper half portion extending outside the top of the main body 132 in such a manner that the straddle column 140 can be caused to move up and down. The extended portion of the straddle column 140 is fitted over with a spring 141 for providing the straddle column 140 with an elastic force enabling the straddle column 140 to retrieve. Each straddle column 140 is provided at the waist portion thereof with two lugs 142. Each straddle column 140 is further provided at the extended end thereof with a key 144 and a slidable retaining plate 146 provided at the top fringe thereof with a stopping slot 148 and two releasing slots 149, which are provided respectively with an inclined plane 150. The stopping slot 148 is provided with a stopping portion 151 located under the inclined plane 150. The slidable retaining plate 146 is provided at the top fringe thereof with two indentations 153 adjacent to the stopping slot 148 and the releasing slots 149. The slidable retaining plate 146 is provided respectively at both ends thereof with an arm 147 by which the slidable retaining plate 146 is slidably fastened to the main body 132. A spring 152 is fitted over one of the two arms 147 of the slidable retaining plate 146 for providing an elastic force enabling the slidable retaining plate 146 to slide in one direction. The slots 148 and 149 are corresponding in location to the straddle columns 140. The switching set 130 is corresponding in location to the rocking arm 120. One of the two arms 147 of the slidable retaining plate 146 is corresponding in location to the urging portion 122 of the rocking arm 120. An elastic element 155 has one end engaging the base 10 and another end engaging a through hole located at another end of the rocking arm 120 for providing the rocking arm 120 with an elastic force enabling the rocking arm 120 to undertake an angular displacement so as to keep the free end of the rocking arm 120 to urge upwardly the press rod 110, thereby causing the two columnar portions 113 and 114 of the resisting portion 112 to extend beyond the top of the housing 12, as shown in FIG. 3. In the meantime, the urging portion 122 is caused to urge the arm 147 of the slidable retaining plate 146 so as to cause the slidable retaining plate to displace leftwards, as shown in FIG. 17.

Figure 16:
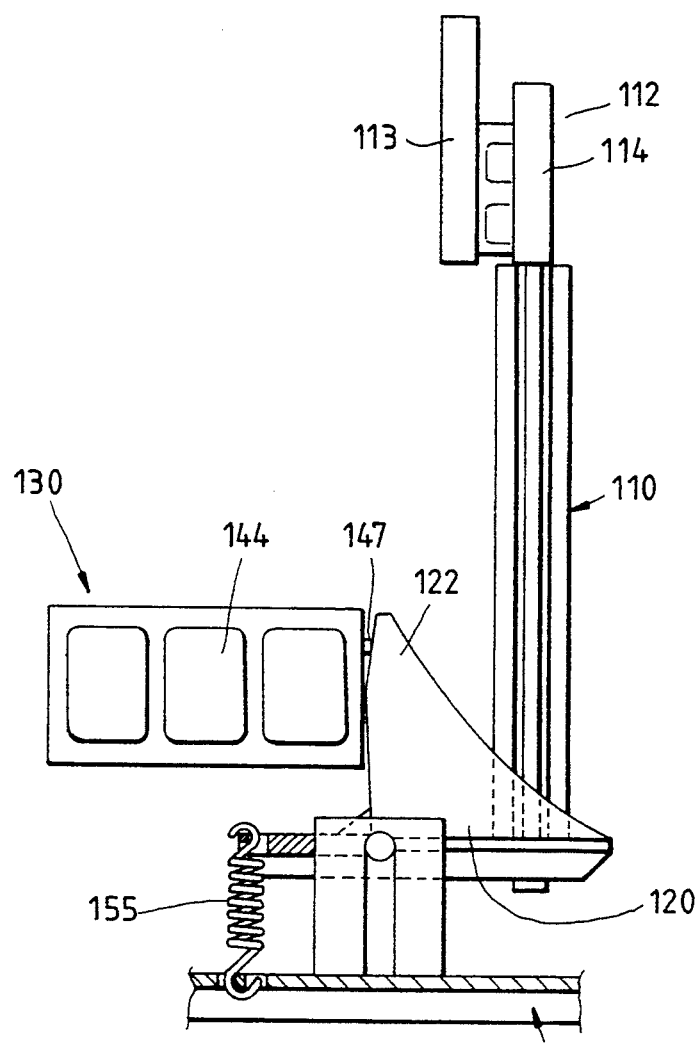
FIG. 16 is a schematic view showing the way that another safety device is disposed.
Figure 18:
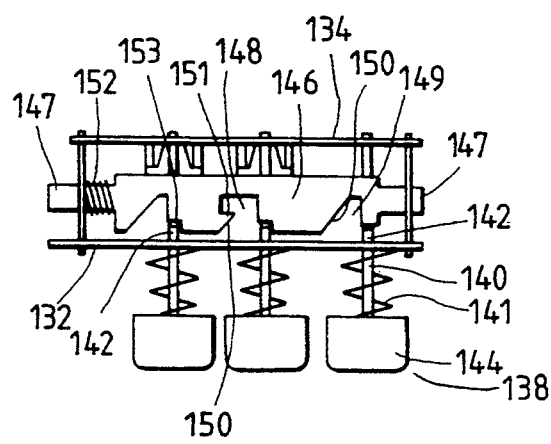
FIG. 18 is a schematic view showing a relative position of a sliding and retaining plate of the switch of FIG. 16, which is urged by a rocking arm.
Figure 17:
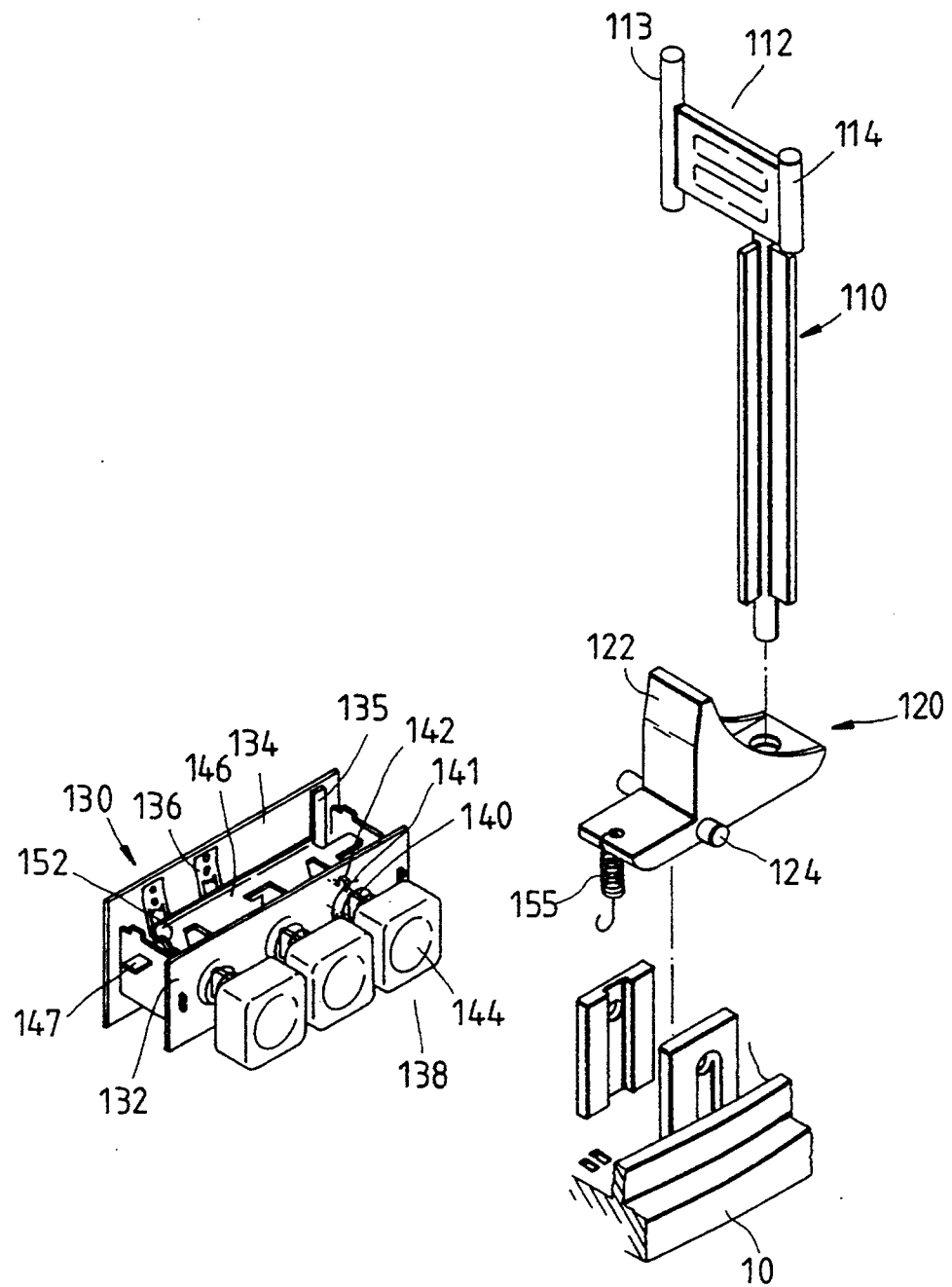
FIG. 17 is an exploded view of FIG. 16.

In combination, the urging portion 122 of the rocking arm 120 is forced by the elastic element 155 to urge the arm 147 of the slidable retaining plate 146 of the switching set 130, as illustrated in FIG. 16, thereby causing the slidable retaining plate 146 to displace leftwards. In the meantime, the resisting portion 112 of the press rod 110 is caused to move outside the housing 12, as shown in FIG. 18. As a result, the lug 142 of each straddle column 140 is no longer corresponding in location to the inclined plane 150 of the slots 148 and 149. Therefore, when the key 144 is pressed, the lug 142 of the straddle column 140 is caused to press only the top edge of the slidable retaining plate 146, which is unable to move downward to connect or disconnect the line.

Figure 20:
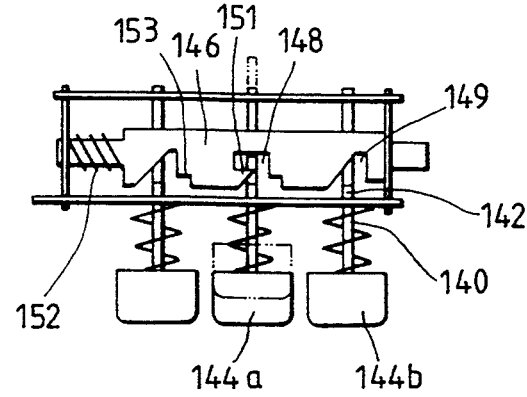
FIG. 20 is a schematic view showing a relative position of the sliding and retaining plate of the switch of FIG. 18, which is not urged by the rocking arm.
Figure 19:
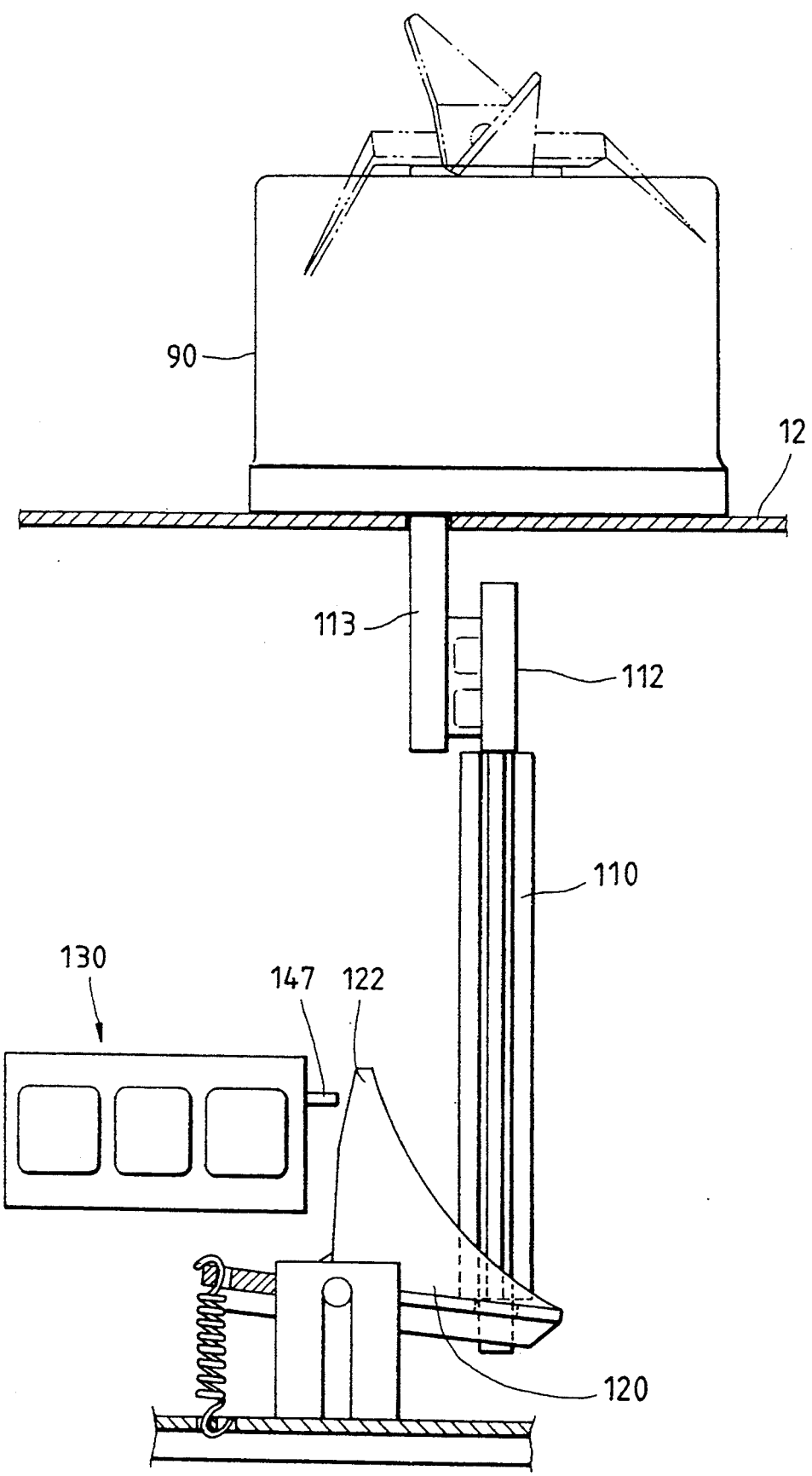
FIG. 19 is a schematic view showing the way that a press rod is urged.

As shown in FIG. 19, the cup seat 90 is mounted on the housing 12 such that the columnar portion 113 of the resisting portion 112 of the press rod 110 is pressed by the cup seat 90 so as to force the press rod 110 to move downwards. Such a downward displacement of the press rod 110 causes the rocking arm 120 to undertake an angular displacement. In the meantime, the slidable retaining plate 146 is no longer under the influence of the urging portion 122 and is forced by the spring 152 to move rightwards to return to its operating position, as shown in FIG. 20. The lugs 142 of the straddle columns 140 are now corresponding respectively in location to the slots 148 and 149. As an action key 144a is pressed, the lug 142 of the straddle column 140 is caused to move downwards to act on the inclined plane 150 of the stopping slot 148, thereby causing the slidable retaining plate 146 to slide leftwards. In the meantime, the straddle column 140 is caused to keep moving downwards, so as to cause the stopping portion 151 to retain the lug 142, as shown by the dotted lines in FIG. 20. Therefore, the power conducting piece 135 and the conductive piece 136 are so fastened that they keep the circuits connected to enable the juicer of the present invention to operate.

As a releasing button 144b is pressed, the lug 142 of the straddle column 140 is caused to act on the inclined plane 150 of the releasing slot 149 so as to cause the slidable retaining plate 146 to move leftwards again, thereby causing the stopping portion 151 to release the lug 142, as illustrated by the solid lines in FIG. 20. The circuits are therefore cut off.

Figure 15:
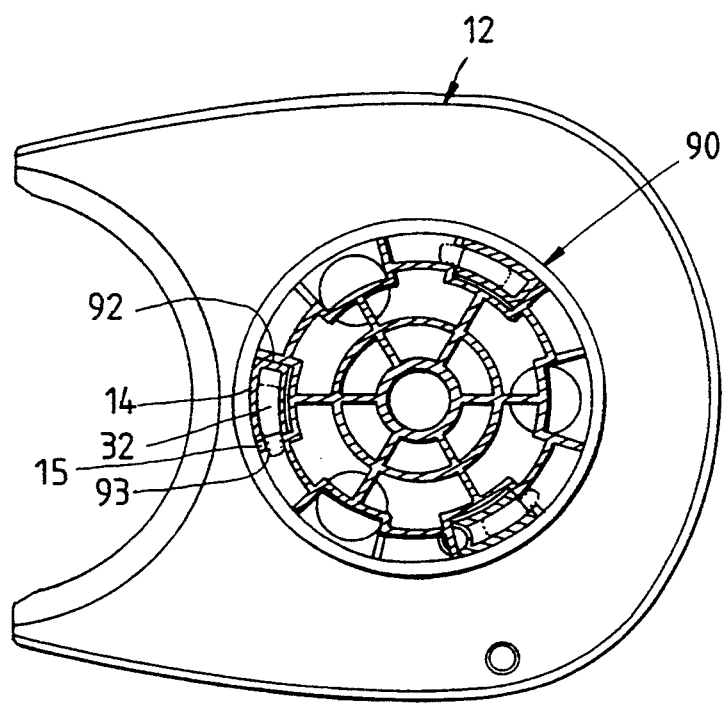
FIG. 15 is a sectional view of a portion taken along the line 15—15 as shown in FIG. 14, showing the way that the fastening member retains the cup seat.

The top of the press rod 110 is immediately relieved of the pressure exerting thereon as soon as the cup body 88 is removed. As a result, the rocking arm 120 is forced by the elastic element 155 to undertake counterclockwise an angular displacement, so as to urge again the slidable retaining plate 146 to slide leftwards and to urge upwards the press rod 110, as shown in FIG. 15. The key 144 can no longer be pressed to safeguard the safety of a user of the processor of the present invention. In the meantime, the slidable retaining plate 146 is located by means of its indentations 153, which engage the lugs 142.

When the processor of the present invention is kept in an operating state, the slidable retaining plate 146 of the switching set 130 is not acted on by the coupled mechanism of the press rod 110 and the rocking arm 120. As a result, the switching set 130 remains in a state shown by the dotted lines in FIG. 20. In case the cup body 88 is lifted accidentally at the time when the processor is in operation, the press rod 110 is not pressed so that the rocking arm 120 is acted on by the elastic element 155 to undertake an angular displacement, and that the slidable retaining plate 146 is caused to slide to return to a position as shown in FIG. 20. As the slidable retaining plate 146 is caused to slide, the stopping portion 151 is no longer able to retain the lug 142 of the straddle column 140, thereby enabling the straddle column 140 to move away to cut off the power supply so as to bring the processor in operation to a halt. Similarly, if the cup seat 90 is not mounted on the housing 12, the power supply remains off.

Figure 21:
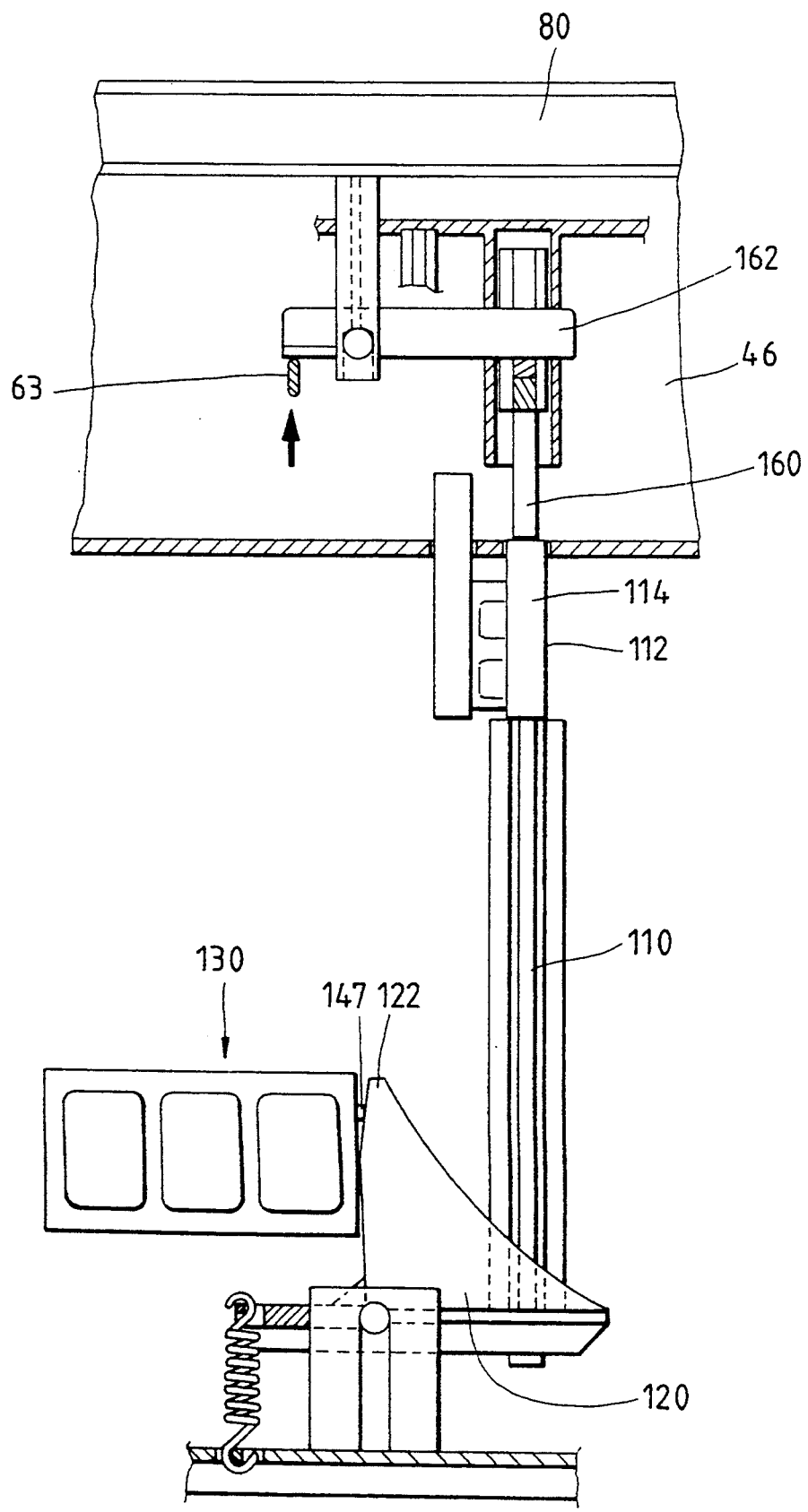
FIG. 21 shows another schematic view of the present invention in use.

As shown in FIG. 21, the cover body 46 is provided therein with an upright connection rod 160 having a bottom end that is coupled with the top end of the press rod 110. The cover body 46 is provided at the top edge of the inner wall thereof with a lever 162 having one end that is coupled with the top end of connection rod 160. When the rotary button set member 62 is caused to retain the cap 80, a rib 63 of the rotary button set member 62 is caused to act on another end of the lever 162 so as to cause the connection rod 160 to press the columnar portion 114 of the press rod 110, as shown in FIG. 19.

When the cap 80 is no longer retained by the rotary button set member 62, the lever 162 can not be moved so as to safeguard the user of the juicer. If the cap 80 is removed accidentally, the switching set 130 will be activated to cut off the power to safeguard the user of the juicer of the present invention.

What is claimed is:

1. A vegetable and fruit juice processor and a safety device thereof comprising:
   a base;
   a housing mounted on said base;
   a motor mounted in said housing and provided with a transmission shaft extending through a top of said housing;
   a switching set for controlling the operation of said motor;
   a driving body fastened to a top end of said transmission shaft;
   a rotary cutting body comprising a covering portion and a support portion;
   a toothed cutter mounted on said covering portion;
   a filtration screen surrounding said support portion; and
   a cap;
   wherein said processor further comprises:
   a cover body provided therein a receiving space having a first receiving slot and a second receiving slot, said first receiving slot being provided at the bottom thereof with a slope of a predetermined angle of inclination; and
   a channel disposed in an outer wall of said receiving space such that said channel is in communication with a front edge of said first receiving slot;
   wherein said cover body is detachably mounted on a top fringe of said housing; wherein said rotary cutting body is disposed in said receiving space of said cover body; and wherein said support portion of said rotary cutting body is provided circumferentially at the top fringe thereof with a moving portion that is received in said second receiving slot.

2. The vegetable and fruit juice processor and a safety device thereof in accordance with claim 1 further comprising a predetermined number of elastic retaining members, each of which has one body portion fastened to the inside of said housing and another body portion forming a retaining hooked portion and a press portion, which extend to the outside of said housing, said press portion being intended to be pressed by hand to cause said retaining hooked portion to retain said cover body.

3. The vegetable and fruit juice processor and a safety device thereof in accordance with claim 1 further comprising a predetermined number of rotary button set members disposed respectively in both sides of said cover body for retaining said cap.

4. The vegetable and fruit juice processor and a safety device thereof in accordance with claim 2 further comprising a fastening member having a piece body and a moving portion connected with said piece body, said piece body being provided with a plurality of arresting portions corresponding in number to said elastic retaining members, said fastening member being pivoted in said housing, each of said arresting portions being corresponding in location to each of said elastic retaining members, said moving portion extending outside said housing for being moved by hand to cause each of said arresting portions to extend into each of said elastic retaining members so as to prevent said each of said elastic retaining members from being pressed.

* * * * *